(12) United States Patent
Paek et al.

(10) Patent No.: US 7,474,475 B2
(45) Date of Patent: Jan. 6, 2009

(54) OPTICAL LENS, OPTICAL PACKAGE HAVING THE SAME, BACKLIGHT ASSEMBLY HAVING THE SAME, DISPLAY DEVICE HAVING THE SAME, AND METHOD THEREOF

(75) Inventors: Jung-Wook Paek, Suwon-si (KR); Jin-Soo Kim, Seoul (KR); Eun-Jeong Kang, Asan-si (KR); Jin-Sung Choi, Cheonan-si (KR); Sang-Hoon Lee, Yongin-si (KR); Si-Joon Song, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/435,496

(22) Filed: May 17, 2006

(65) Prior Publication Data
US 2007/0024990 A1 Feb. 1, 2007

(30) Foreign Application Priority Data
Jul. 26, 2005 (KR) ...................... 10-2005-0067795

(51) Int. Cl.
*G02B 17/00* (2006.01)
(52) U.S. Cl. ..................................... 359/726
(58) Field of Classification Search ................. 359/726, 359/724, 641, 642, 727, 737, 708, 710, 712; 362/334–336
See application file for complete search history.

(56) References Cited

U.S. PATENT DOCUMENTS

| | | | | |
|---|---|---|---|---|
| 6,104,545 A * | 8/2000 | Tsuchida | ..................... | 359/654 |
| 6,755,556 B2 * | 6/2004 | Gasquet et al. | ............. | 362/336 |
| 7,083,313 B2 * | 8/2006 | Smith | ......................... | 362/335 |
| 2003/0235050 A1 * | 12/2003 | West et al. | .................. | 362/336 |
| 2004/0252390 A1 * | 12/2004 | Benitez et al. | .............. | 359/858 |

* cited by examiner

*Primary Examiner*—Alicia M Harrington
(74) *Attorney, Agent, or Firm*—Cantor & Colburn LLP

(57) ABSTRACT

An optical lens includes a recessed part and a refracting part. The recessed part has a substantially circular plan view and a substantially V shaped cross-section. The recessed part forms an angle of no more than an angle of about 20° with respect to a vertical line. The recessed part has a plurality of curved surfaces including different radii so that a light incident into the recessed part is totally reflected from the curved surfaces. The refracting part has a substantially circular plan view extended from the recessed part. A light incident into the refracting part and the reflected light from the recessed part are refracted from the refracting part. Therefore, a luminance uniformity and a color uniformity are improved.

8 Claims, 19 Drawing Sheets

NORMAL DIRECTION WITH RESPECT TO A REFERENCE PLANE

OPTICAL LENS, OPTICAL PACKAGE HAVING THE SAME, BACKLIGHT ASSEMBLY HAVING THE SAME, DISPLAY DEVICE HAVING THE SAME, AND METHOD THEREOF

This application claims priority to Korean Patent Application No. 2005-67795, filed on Jul. 26, 2005 and all the benefits accruing therefrom under 35 U.S.C. §119, and the contents of which in its entirety are herein incorporated by reference.

BACKGROUND OF THE INVENTION

1. Field of the Invention

The present invention relates to an optical lens, an optical package having the optical lens, a backlight assembly having the optical lens, a display device having the optical lens, and a method thereof. More particularly, the present invention relates to an optical lens capable of improving a luminance uniformity and a color uniformity, an optical package having the optical lens, a backlight assembly having the optical lens, a display device having the optical lens, and a method of emitting uniform light from a backlight assembly.

2. Description of the Related Art

Liquid crystals of a liquid crystal display ("LCD") device vary arrangement in response to an electric field applied thereto, and a light transmittance of the liquid crystals is changed to display an image. Because the LCD device is not self-emitting, it requires a light source to display the image. The LCD device displays the image using an externally provided light or an internally provided light.

Examples of the light source include a light emitting diode ("LED"), a cold cathode fluorescent lamp ("CCFL"), a flat fluorescent lamp ("FFL"), etc. A large screen LCD device includes the CCFL and the FFL. A small screen LCD device includes the LED.

The LED, in general, has a substantially quadrangular chip shape from which the light is generated. The LED is a substantially point light source. The light generated from the LED is distributed in a Lambertian distribution.

FIG. 1A is a perspective view showing a Lambertian distribution of a light generated from a point light source. FIG. 1B is a plan view showing the Lambertian distribution shown in FIG. 1A.

Referring to FIG. 1A, the Lambertian distribution of the light generated from the point light source has a substantially spherical shape. A distance between the point light source and one point on a surface S of the spherical shape corresponds to an amount of a light on the one point at an angle formed between a vertical line and a straight line from the point light source to the one point of the surface S.

A volume of a cone formed by the point light source and a portion of the surface S is substantially proportional to an amount of a light passing through the portion of the surface S.

Referring to FIG. 1B, an area of a contour formed by the point light source and a portion of a circumference C is substantially proportional to the amount of the light passing through the portion of the circumference C.

A distance between the point light source and the portion of the circumference C reaches a maximum value at the vertical line. The distance between the point light source and the portion of the circumference C reaches a minimum value at a horizontal line that is substantially perpendicular to the vertical line. The distance between the point light source and the portion of the circumference C at an oblique light that forms at an angle of about 45° with respect to the vertical line is about 70% of the maximum value. An area of a contour that is formed between angles of about 0° to about 45° with respect to the vertical line is about 80% of an entire area of the circle.

That is, in the Lambertian distribution of the point light source, a vertical portion of the light is larger than a horizontal portion of the light. Therefore, a luminance uniformity and a color uniformity of a display incorporating a backlight assembly having the point light source are deteriorated.

BRIEF SUMMARY OF THE INVENTION

The present invention provides an optical lens capable of improving a luminance uniformity and a color uniformity.

The present invention also provides an optical package having the above-described optical lens.

The present invention also provides a backlight assembly having the above-described optical lens.

The present invention also provides a display device having the above-described optical lens.

The present invention also provides a method of emitting uniform light from the above-mentioned backlight assembly.

Exemplary embodiments of an optical lens in accordance with the present invention include a recessed part and a refracting part. The recessed part has a substantially circular plan view and a substantially V shaped cross-section. Radii of portions of the recessed part forming an angle of about 0° to about 5°, an angle of about 5° to about 10°, an angle of about 10° to about 15°, an angle of about 15° to about 20°, an angle of about 20° to about 25°, an angle of about 25° to about 30°, an angle of about 30° to about 35°, an angle of about 35° to about 40°, and an angle of about 40° to about 45° with respect to a vertical line are about 3.080 mm to about 4.620 mm, about 3.696 mm to about 5.544 mm, about 4.024 mm to about 6.036 mm, about 4.600 mm to about 6.900 mm, about 4.768 mm to about 7.152 mm, about 4.744 mm to about 7.116 mm, about 5.344 mm to about 8.016 mm, about 5.760 mm to about 8.640 mm, and about 5.384 mm to about 8.076 mm, respectively. The refracting part has a substantially circular periphery in plan view and is extended from the recessed part. A light is refracted from the refracting part.

Exemplary embodiments of an optical lens in accordance with the present invention include a recessed part and a refracting part. The recessed part has a substantially circular plan view and a substantially V shaped cross-section. The recessed part forms an angle of no more than about 20° with respect to a vertical line. The recessed part has a plurality of curved surfaces including different radii so that a light incident into the recessed part is totally reflected from the curved surfaces. The refracting part has a substantially circular periphery in plan view and is extended from the recessed part. A light incident into the refracting part and reflected light from the recessed part are refracted from the refracting part.

Exemplary embodiments of an optical package in accordance with the present invention include a base substrate, a point light source, and an optical lens. The point light source is on the base substrate. The optical lens covers the point light source. The optical lens includes a recessed part and a refracting part. The recessed part has a substantially V shaped cross-section. A light incident into the recessed part is totally reflected from the recessed part. The refracting part refracts a light incident into the refracting part and reflected light from the recessed part.

Exemplary embodiments of a backlight assembly in accordance with the present invention include a base substrate and an optical package. The optical package is on the base substrate. The optical package includes a point light source and an optical lens. The optical lens corresponds to the point light source. The optical lens includes a recessed part and a refracting part. The recessed part has a substantially V shaped cross-section. A light incident into the recessed part is totally reflected from the recessed part. A refracting part refracts a light incident into the refracting part and reflected light from the recessed part.

Exemplary embodiments of a display device in accordance with the present invention include a display panel and a backlight assembly. The display panel displays an image using a uniform light. The backlight assembly supplies the display panel with the uniform light. The backlight assembly includes a base substrate, a light emitting member, and an optical lens. The light emitting member is on the base substrate generating a light. The optical lens generates the uniform light based on the light generated from the light emitting member. The optical lens includes a recessed part and a refracting part. The recessed part has a substantially V shaped cross-section, and a portion of the light generated from the light emitting member is totally reflected from the recessed part. The refracting part refracts a remaining portion of the light generated from the light emitting member and reflected light from the recessed part to form the uniform light.

Exemplary embodiments of a method of emitting uniform light from a backlight assembly having a point light source and not including a light guiding plate in accordance with the present invention include providing a point light source on a base substrate, the point light source emitting light, covering the point light source with an optical lens, and completely reflecting light emitted from the point light source incident on a central area of the optical lens to a peripheral area of the optical lens.

According to the present invention, a portion of the light is totally reflected from a central portion of the optical lens so that luminance uniformity and color uniformity are increased.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

Figure 1A:
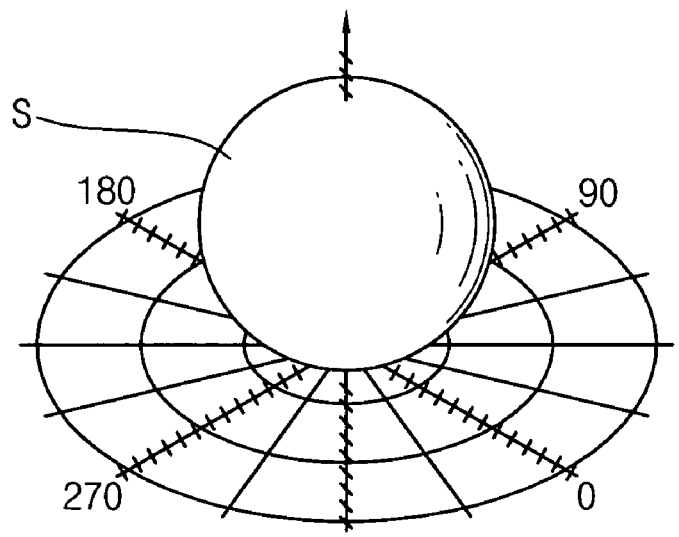
FIG. 1A is a perspective view showing a Lambertian distribution of a light generated from a point light source.
Figure 1B:
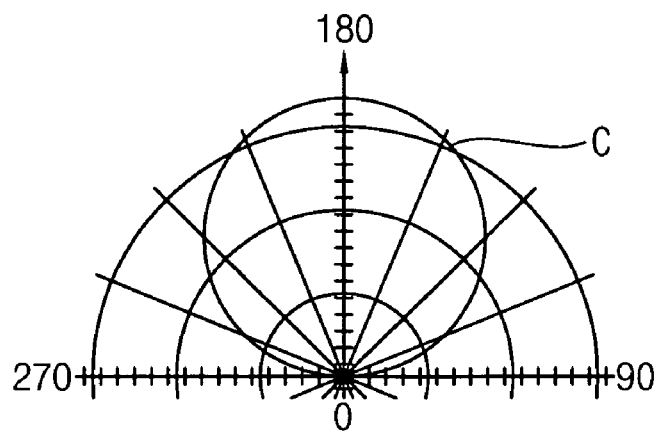
FIG. 1B is a plan view showing the Lambertian distribution shown in FIG. 1A.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
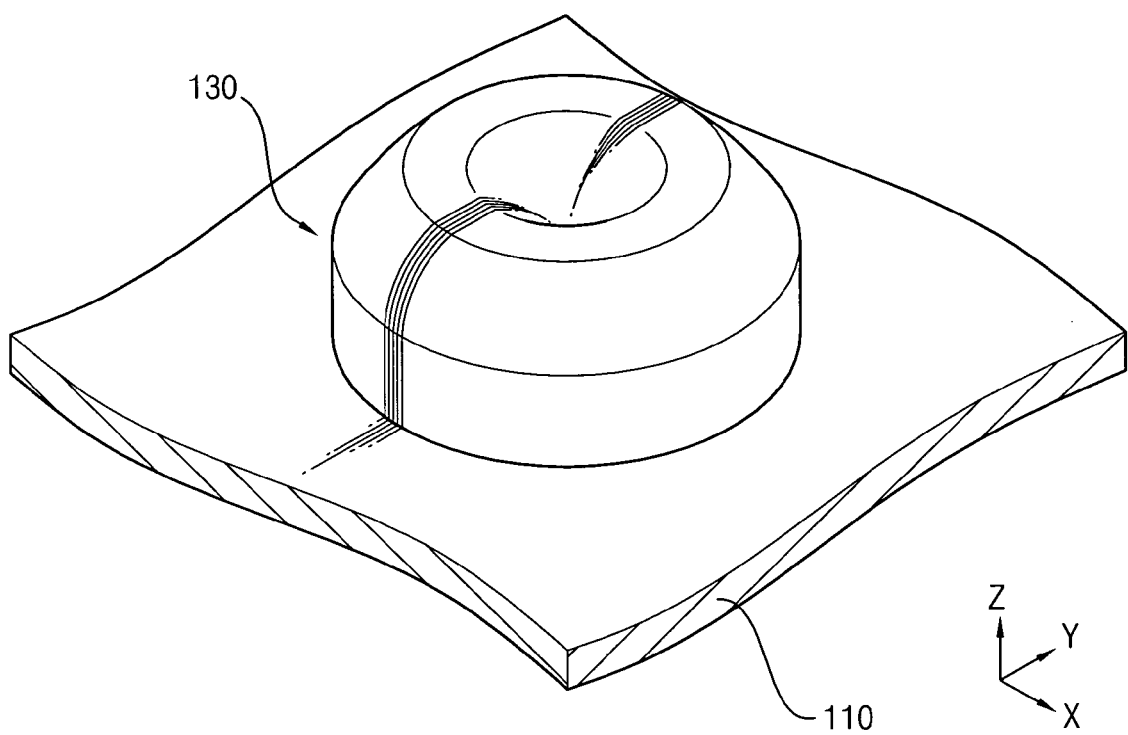
FIG. 2 is a perspective view showing an exemplary embodiment of a light source unit in accordance with the present invention.
Figure 3:
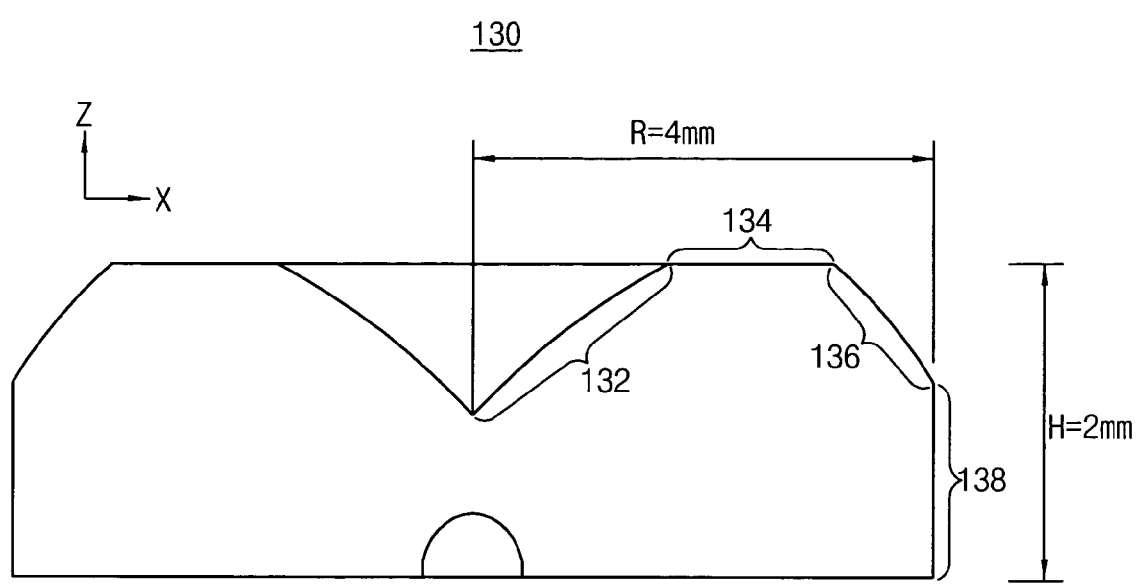
FIG. 3 is a cross-sectional view showing an exemplary embodiment of an optical lens shown in FIG. 2 on an XZ plane.

FIG. 2 is a perspective view showing an exemplary embodiment of a light source unit in accordance with the present invention. FIG. 3 is a cross-sectional view showing an exemplary embodiment of an optical lens shown in FIG. 2 on an XZ plane.

Referring to FIGS. 2 and 3, the light source unit includes a base substrate 110, a point light source (not shown), and an optical lens 130.

The point light source (not shown) is disposed on the base substrate 110 to generate a light. The point light source (not shown) may include a light emitting diode ("LED") having a quadrangular shape.

The optical lens 130 surrounds the point light source (not shown), and makes contact with the base substrate 110. As shown in FIG. 3, the optical lens 130 may include a substantially planar bottom surface for contacting the base substrate 110, and may further include a centrally located indentation for surrounding the point light source. While the bottom surface is illustrated as substantially planar, alternative embodiments may deviate from a substantially planar bottom surface. The optical lens 130 includes a recessed part and a refracting part. The recessed part is on a central portion of the optical lens 130, and has a V shape in cross-section. A converging point of the V-shape may be disposed at a radial center point of the optical lens 130, and may be disposed above the centrally located indentation on the bottom surface of the optical lens 130. A portion of the light generated from the point light source (not shown) is totally reflected from the recessed part. In other words, light generated from the point light source does not exit the optical lens 130 through the recessed part. A remaining portion of the light generated from the point light source (not shown) and the reflected light that is reflected from the recessed part are refracted from the refracting part. A refractive index of the optical lens may be about 1.5. The optical lens 130 includes a first surface 132, a second surface 134, a third surface 136, and a fourth surface 138. The first surface 132 forms the recessed part. The second, third, and fourth surfaces 134, 136, and 138 form the refracting part. A height of the second surface 134, such as measured from the bottom surface of the optical lens 130 or from the top surface of the base substrate 110, may be about 1.6 mm to about 4.8 mm, and defines a height of the optical lens 130. In particular, the height of the second surface 134 may be about 2 mm. A radius of the optical lens 130, defined from the radial center point of the optical lens 130 to the fourth surface 138, is about 3.2 mm to about 4.8 mm. In particular, the radius of the optical lens 130 may be about 4 mm. While particular dimensions of an exemplary optical lens 130 are provided, it should be understood that alternate dimensions would also be within the scope of these embodiments, such as alternate dimensions made to conform with variously sized elements used in conjunction with the optical lens 130.

The first surface 132 forms an angle of no more than about 20° with respect to the point light source 120, as shown in FIGS. 4A to 4D, and a vertical line that is substantially perpendicular to a surface of the base substrate 110, such as a vertical line that is substantially perpendicular to the bottom surface of the optical lens 130. The first surface 132 may have a curved shape including a plurality of curved portions having different radii of curvatures. The first surface 132 is recessed with respect to the second surface 134. In plan view, the first surface 132 may be circular-shaped.

The second surface 134 forms an angle of about 20° and about 40° with respect to the point light source 120 and the vertical line that is substantially perpendicular to the surface of the base substrate 110, such as a vertical line that is substantially perpendicular to the bottom surface of the optical lens 130. The second surface 134 may have a flat shape. The second surface 134 is extended from a side of the first surface 132. In plan view, the second surface 134 may be annulus-shaped.

The third surface 136 forms an angle of about 40° and about 70° with respect to the point light source 120 and the vertical line that is substantially perpendicular to the surface of the base substrate 110, such as a vertical line that is substantially perpendicular to the bottom surface of the optical lens 130. The third surface 136 may have a curved shape having one radius of a curvature. Alternatively, the third surface 136 may also have a curved shape including a plurality of curved portions having different radii of curvatures. The third surface 136 is extended from a side of the second surface 134. In plan view, the third surface 136 may be annulus-shaped.

The fourth surface 138 forms an angle of about 70° and about 90° with respect to the point light source 120 and the vertical line that is substantially perpendicular to the surface of the base substrate 110, and may be substantially perpendicular to the bottom surface of the optical lens 130. The fourth surface 138 is extended from a side of the third surface 136. The fourth surface 138 may be substantially perpendicular to the surface of the base substrate 110 and may be substantially perpendicular to the bottom surface of the optical lens 130. In plan view, the fourth surface 138 may be ring shaped, or cylindrically shaped in perspective. In FIG. 3, an interface between the third and fourth surfaces 136 and 138 is higher than a lowest point of the first surface 132. Alternatively, the interface between the third and fourth surfaces 136 and 138 may be no higher than the lowest point of the first surface 132.

FIGS. 4A to 4D are cross-sectional views showing a light passing through exemplary first, second, third, and fourth surfaces of the exemplary embodiment of the optical lens shown in FIG. 3.

Figure 4A:
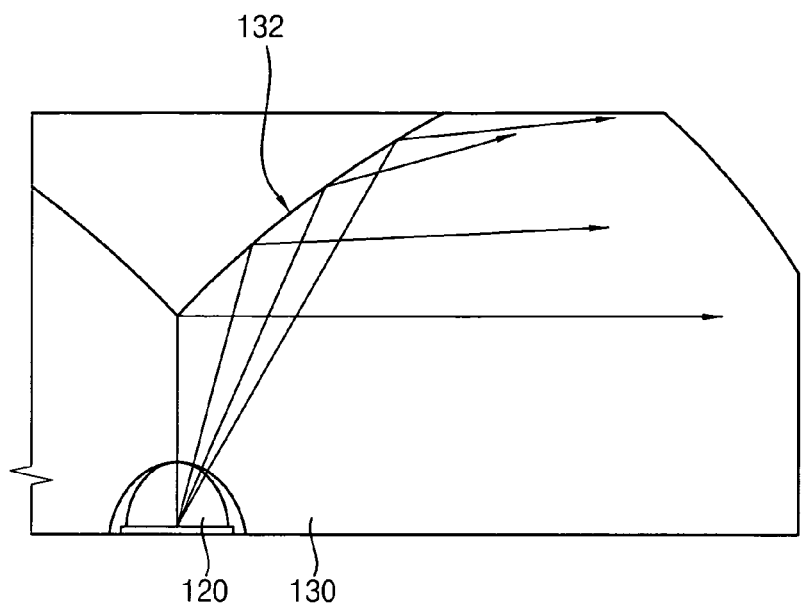
FIGS. 4A to 4D are cross-sectional views showing a light passing through exemplary first, second, third, and fourth surfaces of the exemplary embodiment of the optical lens shown in FIG. 3.

Referring to FIGS. 3 and 4A, the first surface 132 has a substantially circular shape when viewed on a plane. The first surface 132 has the recessed shape with respect to the second surface 134. The first surface 132 guides a portion of the light exiting the point light source 120 in an angle of about 0° to about 20° with respect to a vertical line that is substantially perpendicular to the surface of the base substrate 110 or substantially perpendicular to the surface of the bottom surface of the optical lens 130. The portion of the light having the angle of about 0° to about 20° with respect to the vertical line is totally reflected from the first surface 132 so that the light may not exit a central portion of the optical lens 130.

Figure 4B:
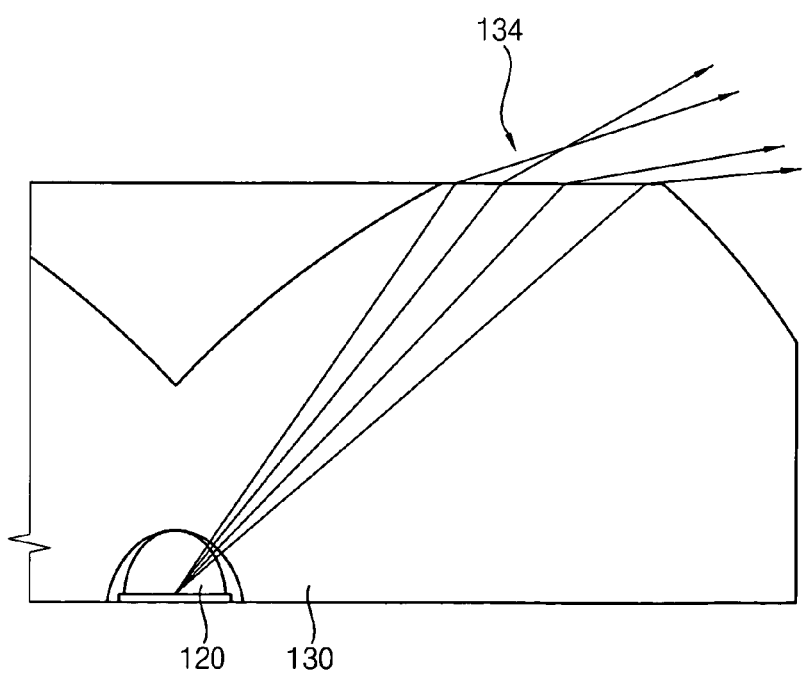

Referring to FIGS. 3 and 4B, the second surface 134 has a substantially circular shape when viewed on the plane. That is, the second surface 134 may have a substantially donut shape or annulus shape. The second surface 134 has a substantially flat shape and may be substantially parallel with the surface of the base substrate 110, and may also be substantially parallel with a bottom surface of the optical lens 130. The second surface 134 guides a portion of the light exiting the point light source 120 in an angle of about 20° to about 40° with respect to the vertical line that is substantially perpendicular to the surface of the base substrate 110. The portion of the light having the angle of about 20° to about 40° with respect to the vertical line is refracted from the second surface 134 so that an exiting angle of the portion of the light is greater than an incident angle of the portion of the light according to Snell's Law.

Figure 4C:
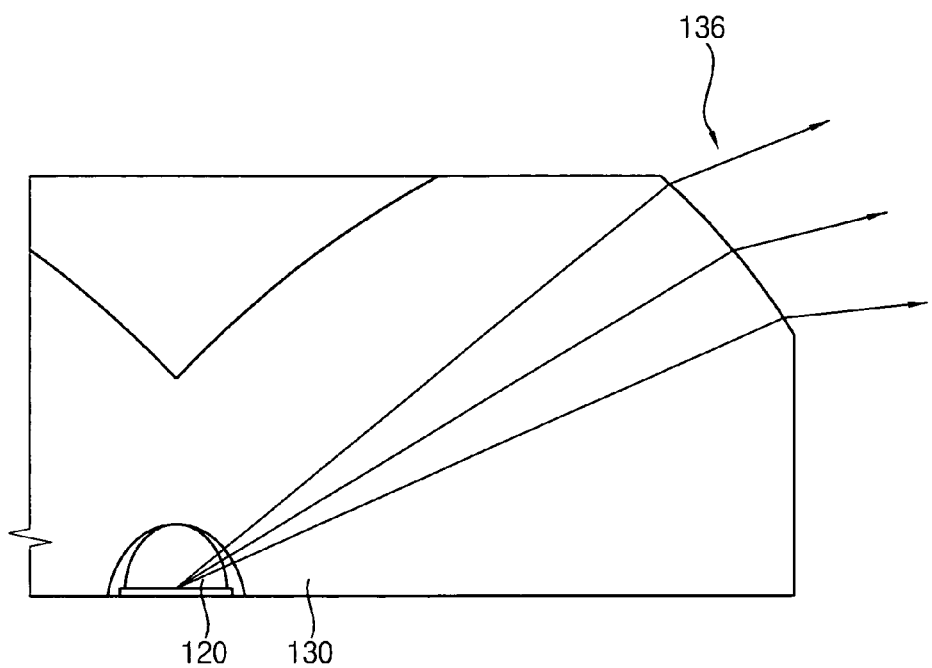

Referring to FIGS. 3 and 4C, the third surface 136 has a substantially circular shape when viewed on the plane. More particularly, the third surface 136 may have an annulus shape when viewed in plan. The third surface 136 is increasingly recessed as a distance from a center of the optical lens 130 increases. The third surface 136 guides a portion of the light exiting the point light source 120 in an angle of about 40° to about 70° with respect to the vertical line that is substantially in perpendicular to the surface of the base substrate 110. Therefore, the entire portion of the light exiting the point light source 120 at the angle of about 40° to about 70° with respect to the vertical line is refracted from the third surface 136 so that an exiting angle of the portion of the light is greater than an incident angle of the portion of the light according to Snell's Law.

Figure 4D:
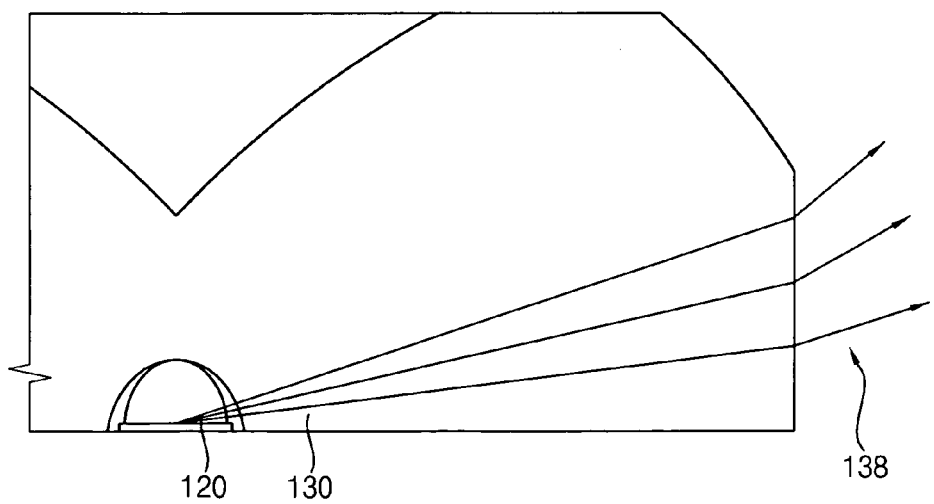

Referring to FIGS. 3 and 4D, the fourth surface 138 has a substantially circular shape when viewed on the plane, such as a plan view of a ring shape or cylinder shape in perspective. The fourth surface 138 is substantially perpendicular to the surface of the base substrate 110, and may be substantially perpendicular to the bottom surface of the optical lens 130. The fourth surface 138 guides a portion of the light exiting the point light source 120 in an angle of about 70° to about 90° with respect to the vertical line that is substantially in perpendicular to the surface of the base substrate 110. Therefore, the entire portion of the light having the angle of about 70° to about 90° with respect to the vertical line is upwardly refracted from the fourth surface 138 so that a luminance of the light source unit is increased.

Figure 5A:
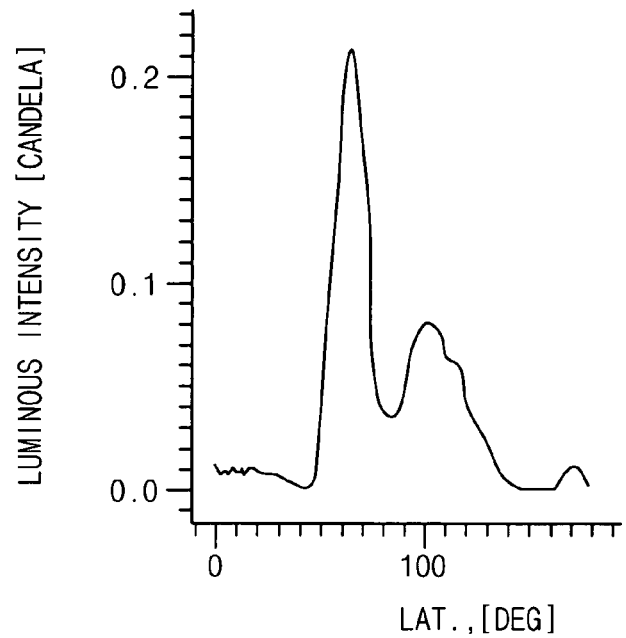
FIGS. 5A and 5B are graphs showing a distribution of a light generated from the exemplary embodiment of the light source unit shown in FIG. 2.
Figure 5B:
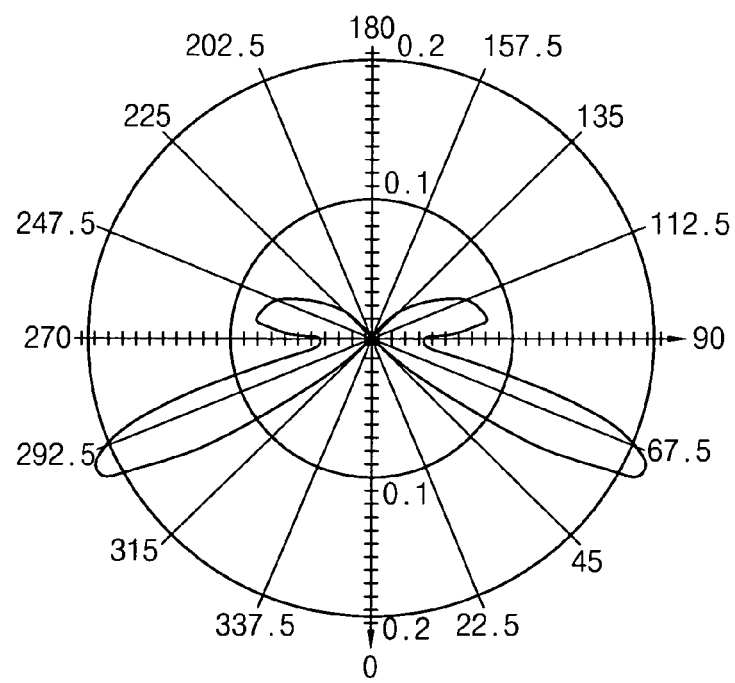

FIGS. 5A and 5B are graphs showing a distribution of a light generated from the exemplary embodiment of the light source unit shown in FIG. 2. FIG. 5A is a graph showing a relationship between an angle from the vertical line and a luminous intensity of the light exiting the exemplary embodiment of the optical lens. FIG. 5B is a graph showing a distribution of the light exiting the exemplary embodiment of the optical lens.

Referring to FIG. 5A, a luminance of the light corresponding to a central portion of the optical lens is low. However, a luminance of the light corresponding to an angle of about 55° to about 65° is about 0.21 Candela that is greatly higher than the luminance of the light corresponding to the central portion of the optical lens.

Referring to FIG. 5B, the point light source is on a center of circular coordinates. A point on the graph represents an amount of the light exiting the point light source. A plurality of points forms a contour line on the graph.

That is, a distance between one of the points on the graph and the point light source is substantially proportional to the amount of the light exiting the point light source at a predetermined angle. A lower portion of the graph of FIG. 5B corresponds to an upper portion of the base substrate when viewed on a plane.

In the contour line of FIG. 5B, the distance from the point light source reaches a maximum at an angle of about 55° to about 65° and at an angle of about 295° to about 305°. About 80% of the entire light amount exiting the point light source is in the maximum range. That is, a vertical portion of the light is smaller than a horizontal portion of the light, in contrast to the distribution of light without the optical lens. Therefore, the light is scattered and exits a peripheral portion of the light source unit so that a light guiding plate that guides the light exiting the optical lens may be omitted, thus reducing a size of a device incorporating the light source unit.

Figure 6:
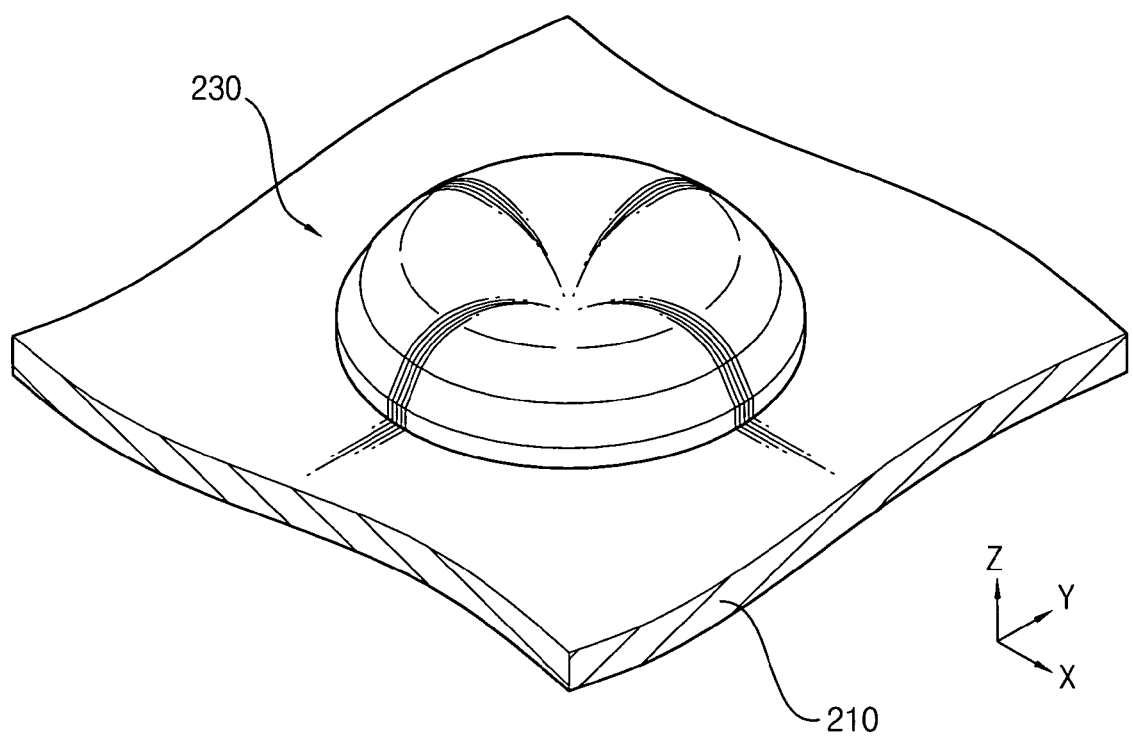
FIG. 6 is a perspective view showing another exemplary embodiment of a light source unit in accordance with the present invention.
Figure 7:
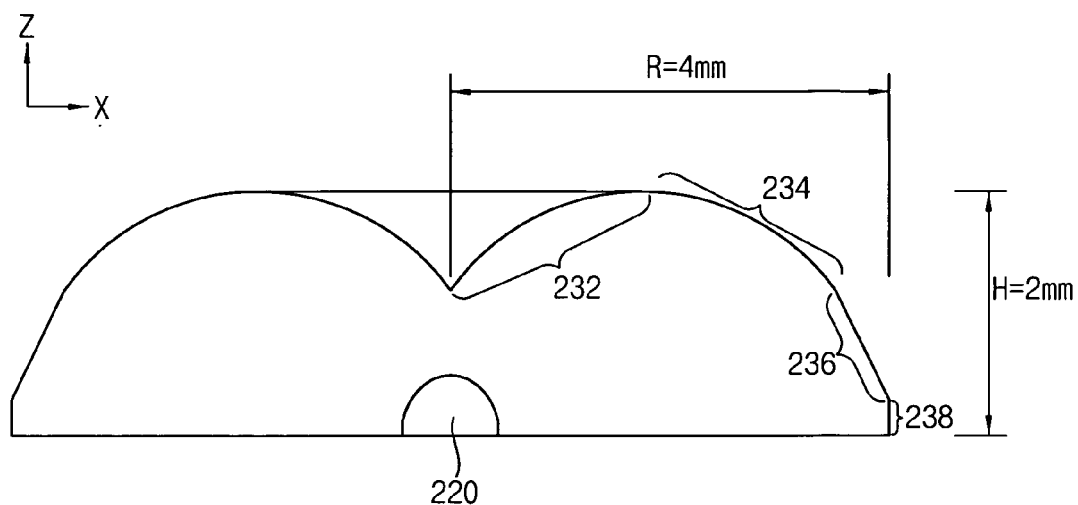
FIG. 7 is a cross-sectional view showing an exemplary embodiment of an optical lens shown in FIG. 6 on an XZ plane.

FIG. 6 is a perspective view showing another exemplary embodiment of a light source unit in accordance with the present invention. FIG. 7 is a cross-sectional view showing an exemplary embodiment of an optical lens shown in FIG. 6 on an XZ plane.

Referring to FIGS. 6 and 7, the optical unit includes a base substrate 210, a point light source (not shown), and an optical lens 230.

The point light source (not shown) is on the base substrate 210 to generate a light. The point light source (not shown) may include a light emitting diode ("LED") having a quadrangular shape.

The optical lens 230 surrounds the point light source (not shown), and makes contact with the base substrate 210. The optical lens 230 may include a substantially planar bottom surface for contacting the base substrate 210, and may further include a centrally located indentation for surrounding the point light source. The optical lens 230 includes a recessed part and a refracting part. The recessed part is on a central portion of the optical lens 230, and has a V shape in cross-section. A converging point of the V-shape may be disposed at a radial center point of the optical lens 230, and may be disposed above the centrally located indentation on the bottom surface of the optical lens 230. A portion of the light generated from the point light source (not shown) is totally reflected from the recessed part. In other words, light generated from the point light source does not exit the optical lens 230 through the recessed part. A remaining portion of the light generated from the point light source (not shown) and the reflected light that is reflected from the recessed part are refracted from the refracting part. The optical lens 230 includes a first surface 232, a second surface 234, a third surface 236, and a fourth surface 238. The first surface 232 forms the recessed part. The second, third, and fourth surfaces 234, 236, and 238 form the refracting part. The height of the optical lens 230 that is a maximum height of the second surface 234, such as measured from the bottom surface of the optical lens 230 or from the top surface of the base substrate 110, may be about 1.6 mm to about 4.8 mm. In particular, the height of the optical lens 230 may be about 2 mm. The radius of the optical lens 230 defined from the radial center point of the optical lens 230 to the fourth surface 238 is about 3.2 mm to about 4.8 mm. In particular, the radius of the optical lens 230 may be about 4 mm. While particular dimensions of an exemplary optical lens 230 are provided, it should be understood that alternate dimensions would also be within the scope of these embodiments, such as alternate dimensions made to conform with variously sized elements used in conjunction with the optical lens 230.

The first surface 232 forms an angle of no more than about 45° with respect to the point light source 220 and a vertical line that is substantially perpendicular to a surface of the base substrate 210, such as a vertical line that is substantially perpendicular to the bottom surface of the optical lens 230. The first surface 232 may have a curved shape including a plurality of curved portions having different radii of curvatures. The first surface 232 is recessed with respect to the second surface 234. In plan view, the first surface 232 may be circular shaped.

The second surface 234 may have a symmetrical shape with respect to the first surface 232. The second surface 234 is extended from a side of the first surface 232. The second surface 234 may have a curved shape having one radius of curvature. Alternatively, the second surface 234 may also have a curved shape including a plurality of curved portions having different radii of curvatures as does the first surface 232. In plan view, the second surface 234 may be annulus-shaped.

The third surface 236 forms an angle of no more than about 135° with respect to the point light source 220 and the vertical line that is substantially perpendicular to the surface of the base substrate 210. The third surface 236 is extended from a side of the second surface 234. The third surface 236 may have a curved shape having one radius of curvature. Alternatively, the third surface 236 may also have a curved shape including a plurality of curved portions having different radii of curvatures. In plan view, the third surface 236 may be annulus-shaped.

The fourth surface 238 defines the circular shape of the optical lens 230 when viewed on the plane. That is, in plan view, the fourth surface 238 may be ring shaped, or cylindrically shaped in perspective. The fourth surface 238 is extended from a side of the third surface 236. The fourth surface 238 may be substantially perpendicular to the surface of the base substrate 210, and may be substantially perpendicular to the bottom surface of the optical lens 230. In FIG. 7, an interface between the third and fourth surfaces 236 and 238 is lower than a lowest point of the first surface 232. Alternatively, the interface between the third and fourth surfaces 236 and 238 may be no lower than the lowest point of the first surface 232.

Figure 8:
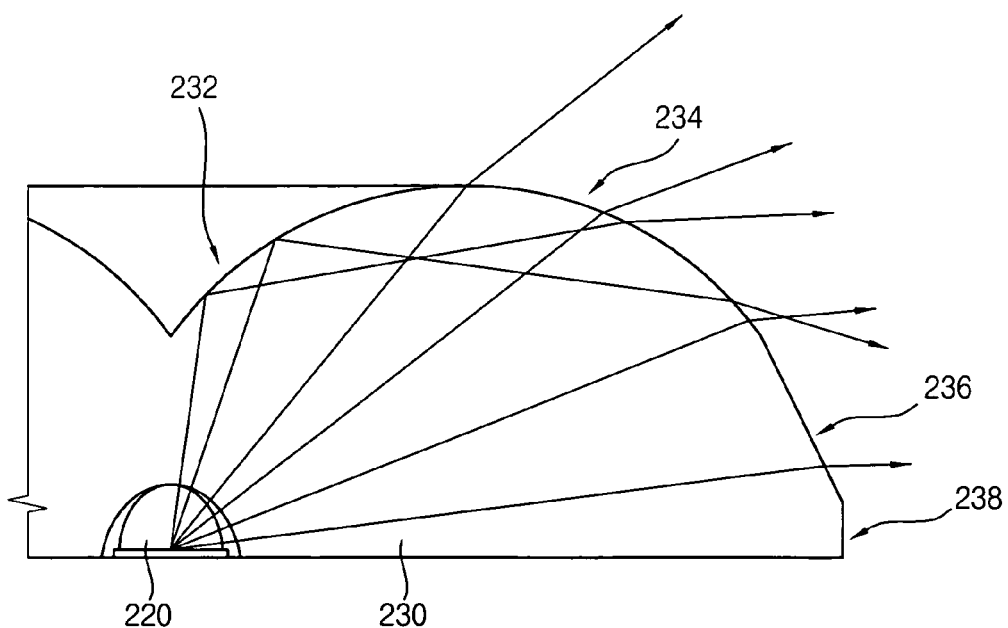
FIG. 8 is a cross-sectional view showing a path of a light generated from the exemplary embodiment of the light source unit shown in FIG. 6.

FIG. 8 is a cross-sectional view showing a path of a light generated from the exemplary embodiment of the light source unit shown in FIG. 6.

Referring to FIGS. 6 to 8, the first surface 232 guides a portion of the light exiting the point light source 220 at an angle of about 0° to about 45° with respect to a vertical line that is substantially perpendicular to the surface of the base substrate 210 or substantially perpendicular to the bottom surface of the optical lens 230. The portion of the light having the angle of about 0° to about 45° with respect to the vertical line is totally reflected from the first surface 232 so that the light may not exit a central portion of the optical lens 230.

The second surface 234 guides a portion of the light exiting the point light source 220 at an angle of about 45° to about 60° with respect to the vertical line that is substantially perpendicular to the surface of the base substrate 210 and may be substantially perpendicular to the bottom surface of the optical lens 230. The portion of the light having the angle of about 45° to about 60° with respect to the vertical line is refracted from the second surface 234 so that an exiting angle of the portion of the light is greater than an incident angle of the portion of the light according to Snell's Law.

The third surface 236 guides a portion of the light exiting the point light source 220 at an angle of about 60° to about 80° with respect to the vertical line that is substantially perpendicular to the surface of the base substrate 210 and may be substantially perpendicular to the bottom surface of the optical lens 230. Therefore, the entire portion of the light having the angle of about 60° to about 80° with respect to the vertical line is refracted from the third surface 236 so that an exiting angle of the portion of the light is greater than an incident angle of the portion of the light according to Snell's Law.

The fourth surface 238 guides a portion of the light exiting the point light source 220 at an angle of about 80° to about 90° with respect to the vertical line that is substantially perpendicular to the surface of the base substrate 210 and may be substantially perpendicular to the bottom surface of the optical lens 230. Therefore, the entire portion of the light having the angle of about 80° to about 90° with respect to the vertical line is upwardly refracted from the fourth surface 238 so that a luminance of the light source unit is increased.

Figure 9:
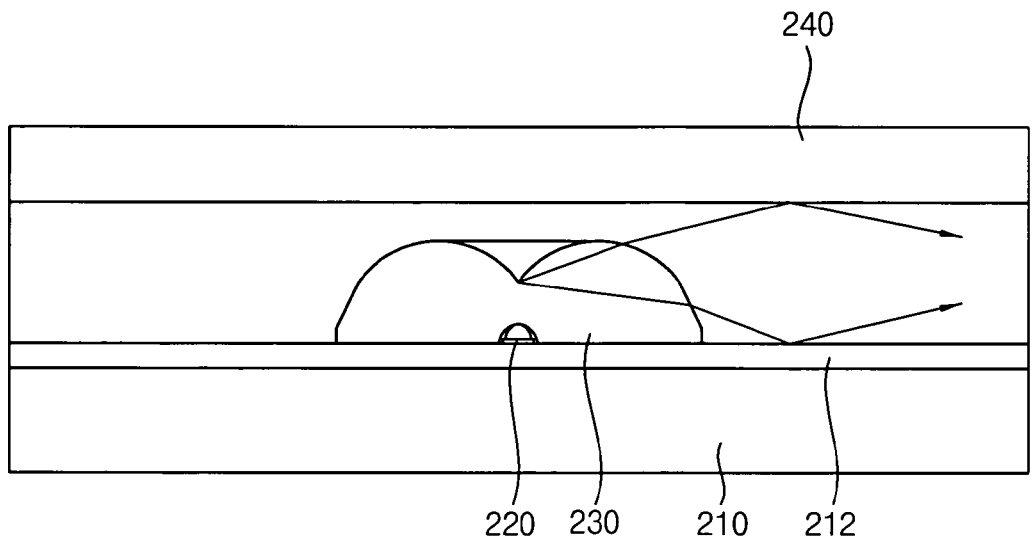
FIG. 9 is a cross-sectional view showing a path of a light generated from the exemplary embodiment of the light source unit shown in FIG. 6 in an exemplary optical package.

FIG. 9 is a cross-sectional view showing a path of a light generated from the exemplary embodiment of the light source unit shown in FIG. 6 in an exemplary optical package.

Referring to FIG. 9, the optical package includes a base substrate 210, a reflection sheet 212, a light emitting diode 220, an optical lens 230, and a diffusion plate 240.

The reflection sheet 212 is on the base substrate 210 so that a light exiting the optical lens 230 or a light reflected from the diffusion plate 240 is reflected from the reflection sheet 212 back towards the diffusion plate 240. The optical lens 230 covers the light emitting diode 220. A portion of the light generated from the light emitting diode 220 is totally reflected from a recessed part of the optical lens 230. A remaining portion of the light generated from the light emitting diode 220 and the reflected portion of the light generated from the light emitting diode 220 are refracted from a refracting portion of the optical lens 230, and exit the refracting portion of the optical lens 230. The diffusion plate 240 is on the optical lens 230.

FIGS. 10A to 10I are cross-sectional views showing surfaces of an exemplary embodiment of an optical lens shown in FIG. 6.

Figure 10A:
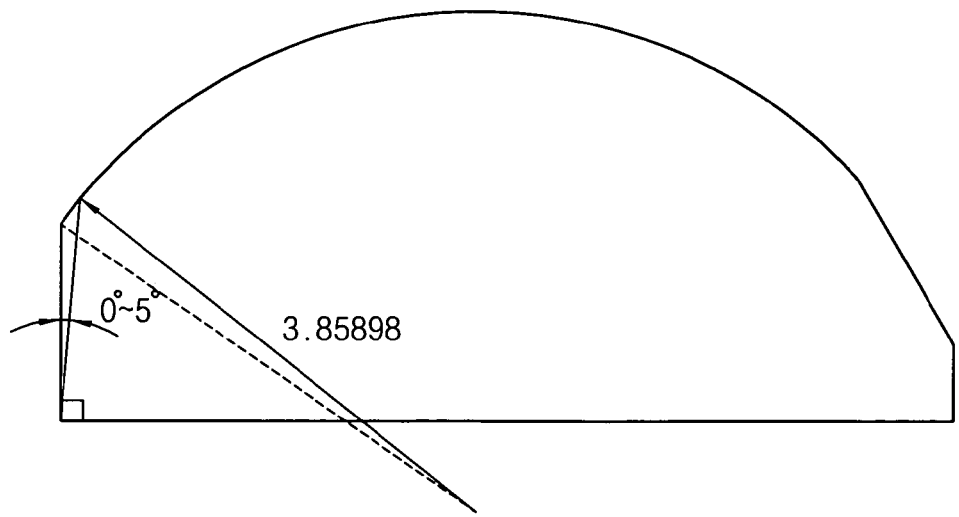
FIGS. 10A to 10I are cross-sectional views showing exemplary surfaces of an exemplary embodiment of an optical lens shown in FIG. 6.
Figure 10B:
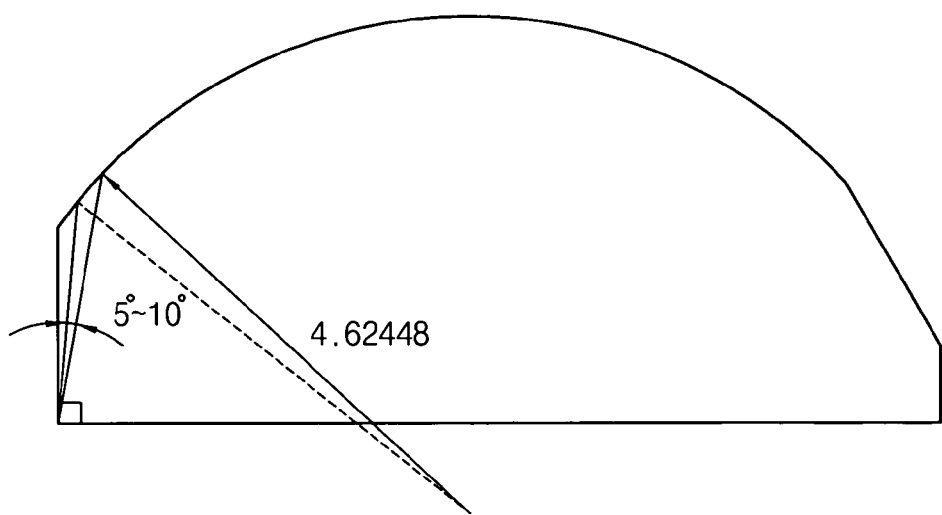
Figure 10C:
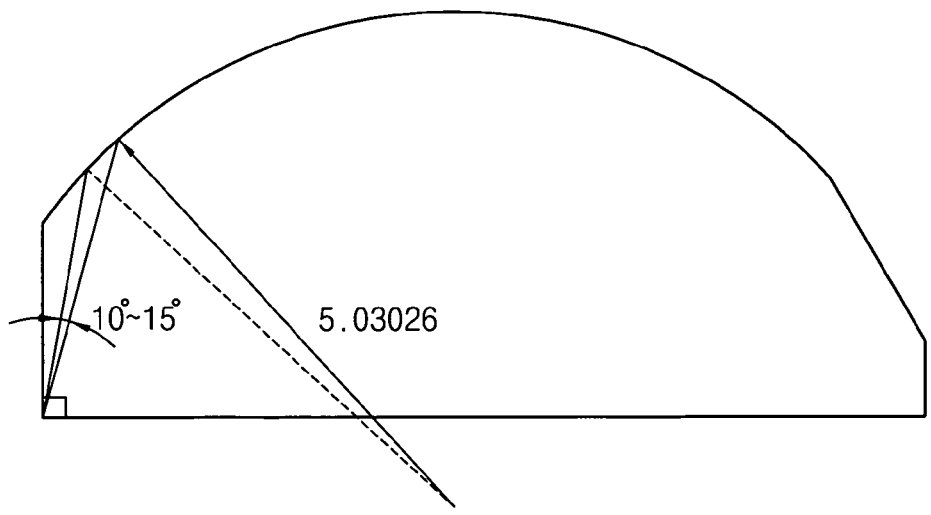
Figure 10D:
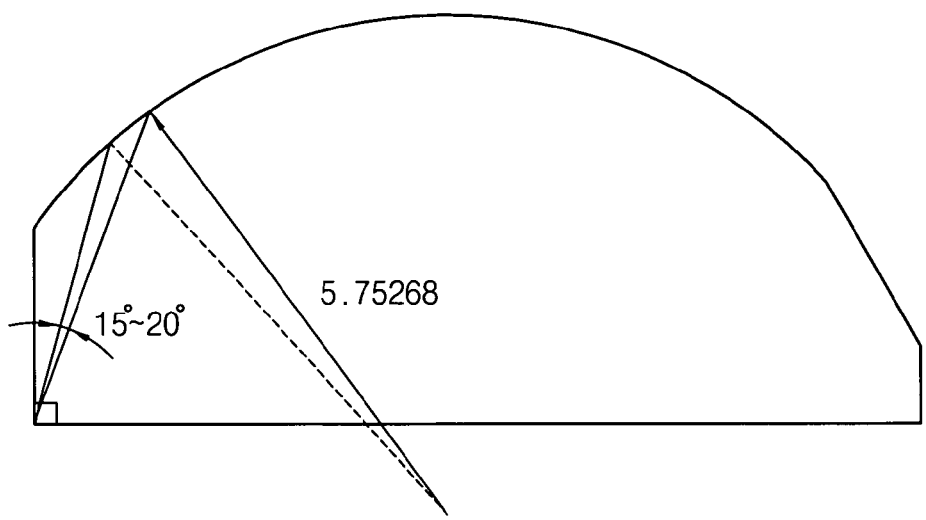
Figure 10E:
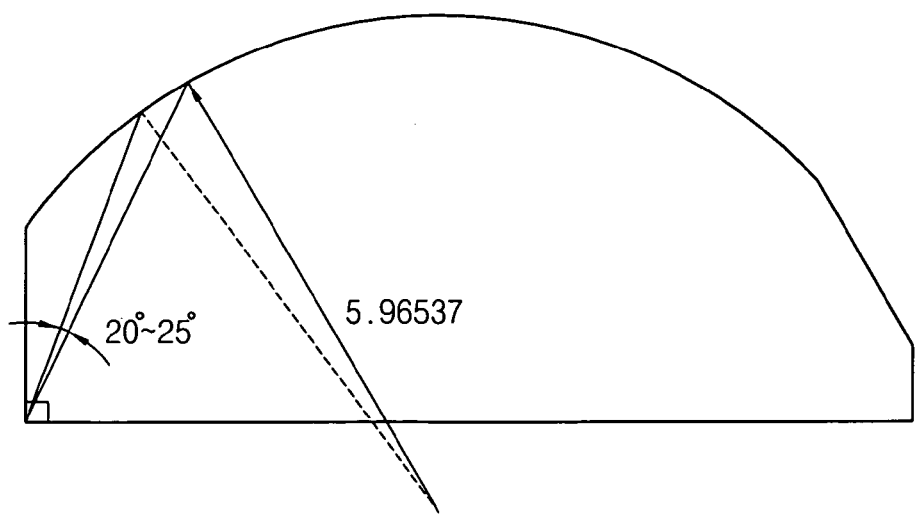
Figure 10F:
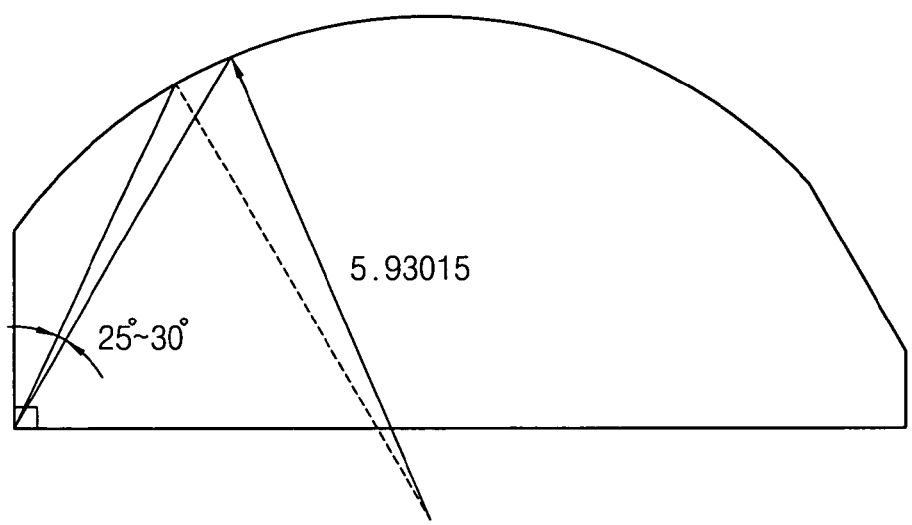
Figure 10G:
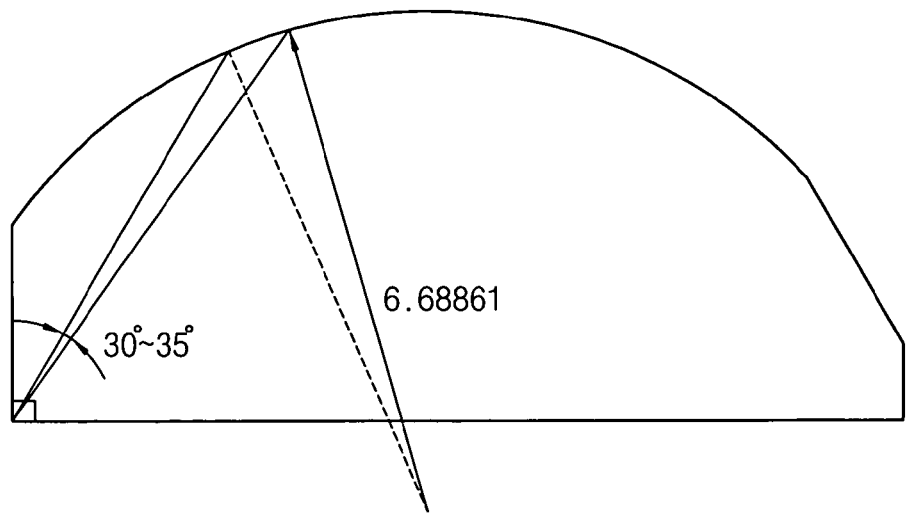
Figure 10H:
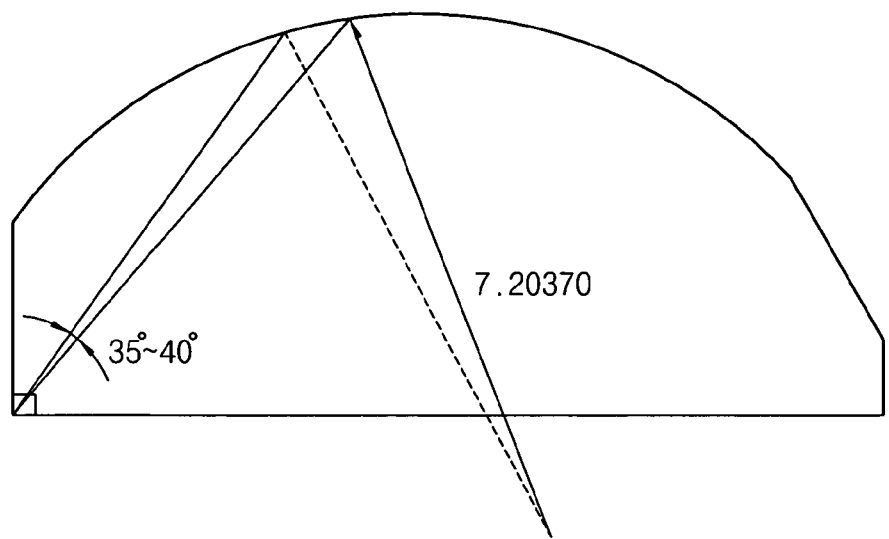
Figure 10I:
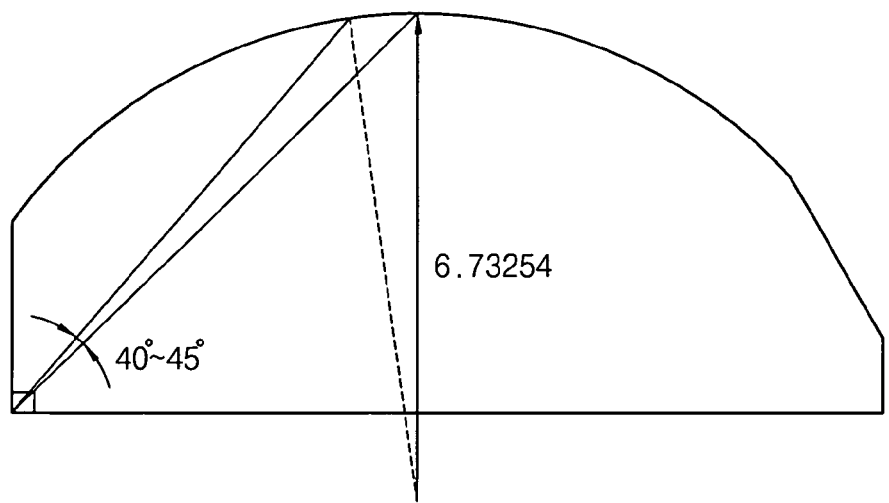

With reference to FIG. 10A, for example, a radius of a portion of the recessed part forming an angle of about 0° to about 5° with respect to the vertical line that is substantially perpendicular to the surface of the base substrate 210 may be about 3.080 mm to about 4.620 mm. For example, the radius of the portion of the recessed part forming the angle 0° to about 5° with respect to the vertical line may be about 3.85898 mm. As shown in FIG. 10B, a radius of a portion of the recessed part forming an angle of about 5° to about 10° with respect to the vertical line that is substantially perpendicular to the surface of the base substrate 210 may be about 3.696 mm to about 5.544 mm. For example, the radius of the portion of the recessed part forming the angle 5° to about 10° with respect to the vertical line may be about 4.62448 mm. As shown in FIG. 10C, a radius of a portion of the recessed part forming an angle of about 10° to about 15° with respect to the vertical line that is substantially perpendicular to the surface of the base substrate 210 may be about 4.024 mm to about 6.036 mm. For example, the radius of the portion of the recessed part forming the angle 10° to about 15° with respect to the vertical line may be about 5.03026 mm. As shown in FIG. 10D, a radius of a portion of the recessed part forming an angle of about 15° to about 20° with respect to the vertical line that is substantially perpendicular to the surface of the base substrate 210 may be about 4.600 mm to about 6.900 mm. For example, the radius of the portion of the recessed part forming the angle 15° to about 20° with respect to the vertical line may be about 5.75268 mm. As shown in FIG. 10E, a radius of a portion of the recessed part forming an angle of about 20° to about 25° with respect to the vertical line that is substantially perpendicular to the surface of the base substrate 210 may be about 4.768 mm to about 7.152 mm. For example, the radius of the portion of the recessed part forming the angle 20° to about 25° with respect to the vertical line may be about 5.96537 mm. As shown in FIG. 10F, a radius of a portion of the recessed part forming an angle of about 25° to about 30° with respect to the vertical line that is substantially perpendicular to the surface of the base substrate 210 may be about 4.744 mm to about 7.116 mm. For example, the radius of the portion of the recessed part forming the angle 25° to about 30° with respect to the vertical line may be about 5.93015 mm. As shown in FIG. 10G, a radius of a portion of the recessed part forming an angle of about 30° to about 35° with respect to the vertical line that is substantially perpendicular to the surface of the base substrate 210 may be about 5.344 mm to about 8.016 mm. For example, the radius of the portion of the recessed part forming the angle 30° to about 35° with respect to the vertical line may be about 6.68861 mm. As shown in FIG. 10H, a radius of a portion of the recessed part forming an angle of about 35° to about 40° with respect to the vertical line that is substantially perpendicular to the surface of the base substrate 210 may be about 5.760 mm to about 8.640 mm. For example, the radius of the portion of the recessed part forming the angle 35° to about 40° with respect to the vertical line may be about 7.20370 mm. As shown in FIG. 10I, a radius of a portion of the recessed part forming an angle of about 40° to about 45° with respect to the vertical line that is substantially perpendicular to the surface of the base substrate 210 may be about 5.384 mm to about 8.076 mm. For example, the radius of the portion of the recessed part forming the angle 40° to about 45° with respect to the vertical line may be about 6.73254 mm.

Figure 11A:
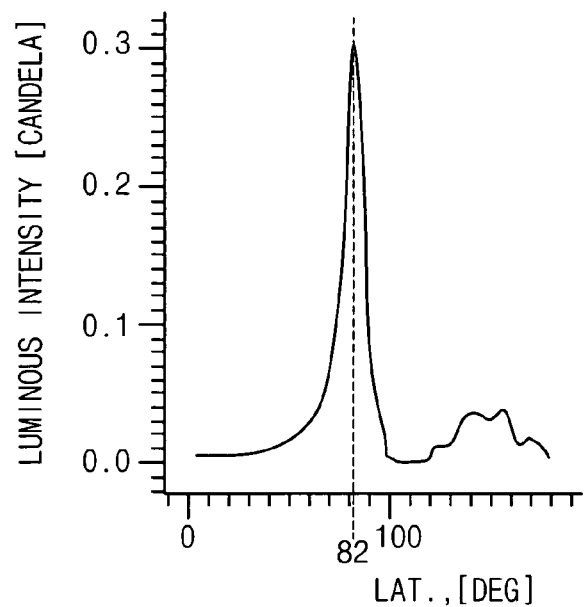
FIGS. 11A to 11C are graphs showing a distribution of a light generated from the exemplary embodiment of the light source unit shown in FIG. 6.
Figure 11B:
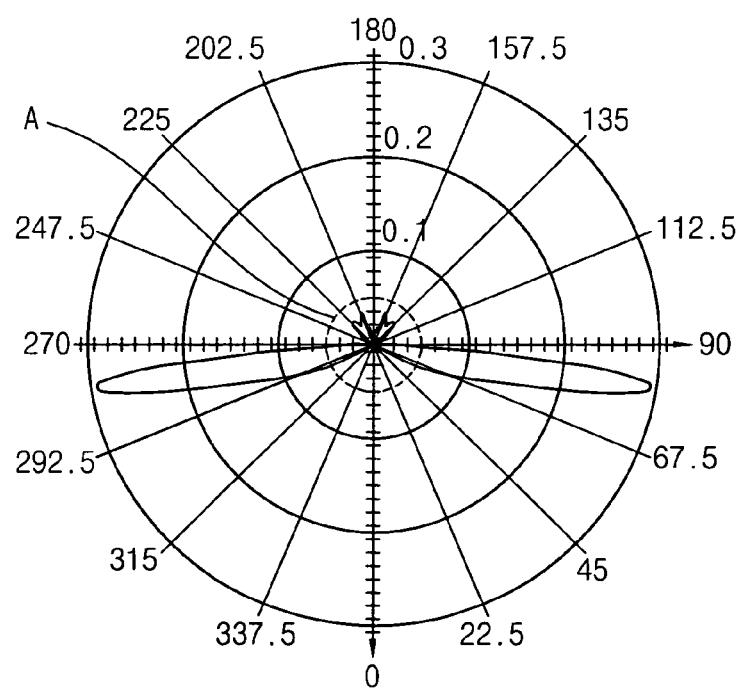
Figure 11C:
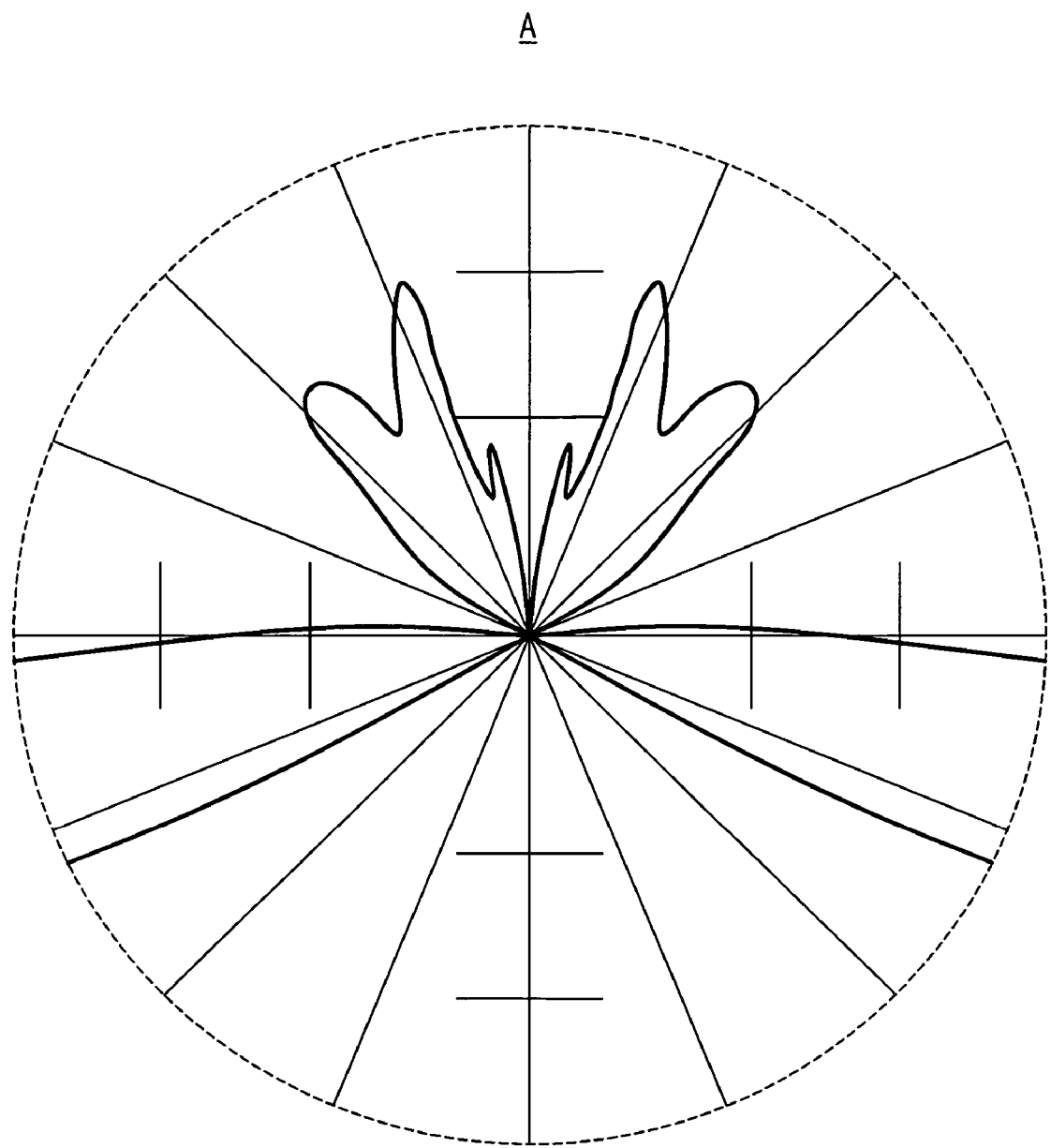

FIGS. 11A to 11C are graphs showing a distribution of a light generated from the exemplary embodiment of the light source unit shown in FIG. 6. FIG. 11A is a graph showing a relationship between an angle from the vertical line and a luminous intensity of the light exiting the exemplary embodiment of the optical lens. FIG. 11B is a graph showing a distribution of the light exiting the exemplary embodiment of the optical lens. FIG. 11C is an enlarged graph showing portion 'A' shown in FIG. 11B.

Referring to FIG. 11A, a luminance of the light corresponding to a central portion of the optical lens is low. A luminance of the light corresponding to an angle of about 85° is about 0.31 Candela that is greatly higher than the luminance of the light corresponding to the central portion of the optical lens.

Referring to FIGS. 11B and 11C, the point light source is on a center of circular coordinates. A point on the graph represents an amount of the light exiting the point light source. A plurality of points forms a contour line on the graph.

That is, a distance between one of the points on the graph and the point light source is substantially proportional to the amount of the light exiting the point light source at a predetermined angle. A lower portion of the graph of FIGS. 11B and 11C corresponds to an upper portion of the base substrate when viewed on a plane.

In the contour line of FIGS. 11B and 11C, the distance from the point light source reaches a maximum at an angle of about 82° and an angle of about 278°. About 80% of the entire amount of the light exiting the point light source is in the maximum range. That is, a vertical portion of the light is smaller than a horizontal portion of the light, in contrast to the distribution of the light without the optical lens. Therefore, the light is scattered and exits a peripheral portion of the light source unit so that a light guiding plate that guides the light exiting the optical lens may be omitted, thus reducing a size of a device incorporating the light source unit.

A luminance uniformity and a color uniformity of the light source unit are increased.

Figure 12:
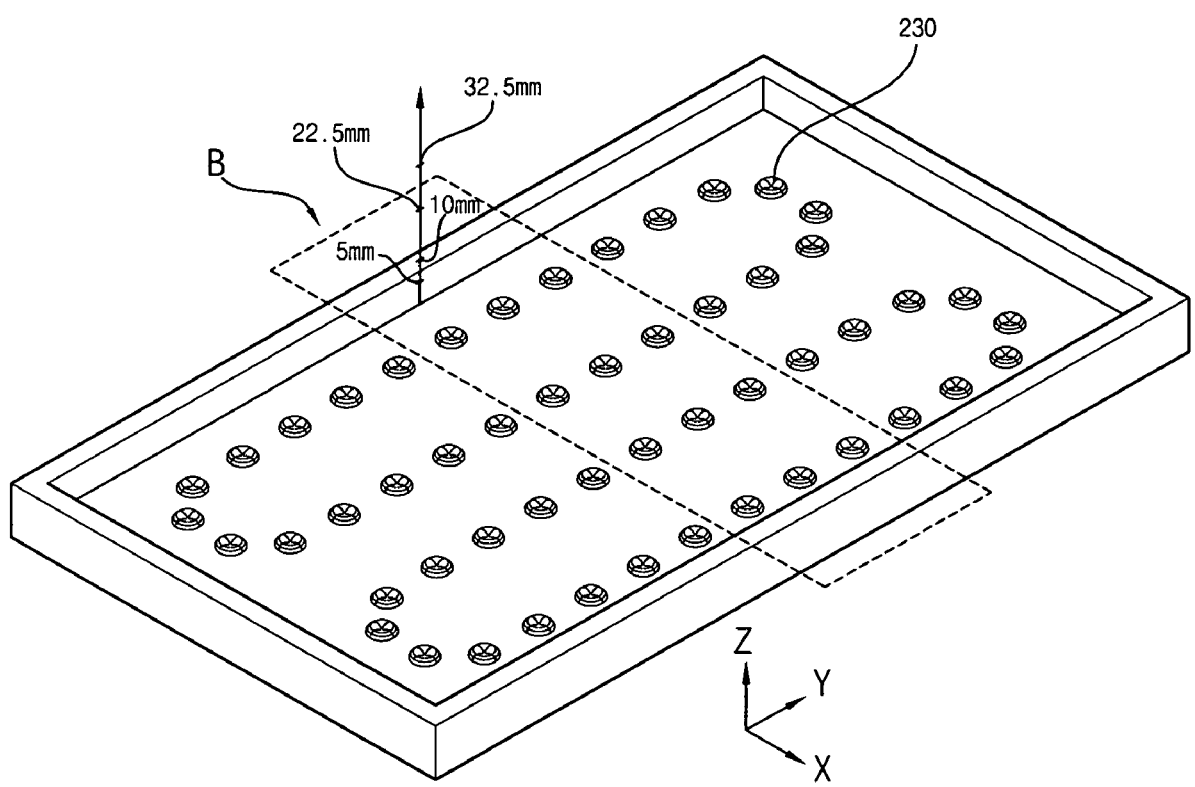
FIG. 12 is a perspective view showing an exemplary backlight assembly having another exemplary embodiment of an optical lens in accordance with the present invention.

FIG. 12 is a perspective view showing an exemplary backlight assembly having an exemplary embodiment of an optical lens in accordance with the present invention. FIGS. 13A to 13D are images showing a distribution of a light generated from an exemplary embodiment of a light source unit shown in FIG. 12.

Figure 13A:
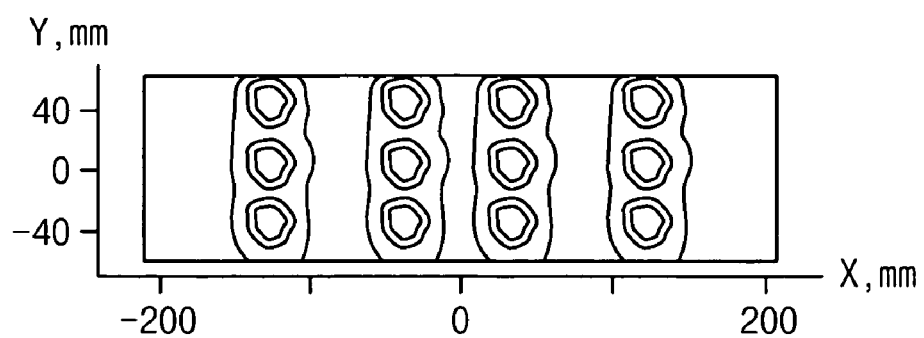
FIGS. 13A to 13D are images showing a distribution of a light generated from an exemplary embodiment of a light source unit shown in FIG. 12.

Referring to FIG. 13A, when the diffusion plate 240 is spaced apart from the optical lens 230 by about 5 mm, a luminance uniformity is very low so that a point shape formed by each of the light emitting diodes and a linear shape formed by linearly arranged light emitting diodes are displayed on the diffusion plate 240.

Figure 13B:
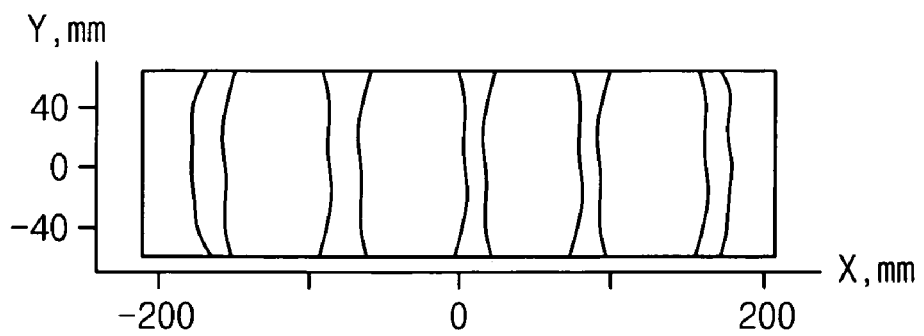

Referring to FIG. 13B, when the diffusion plate 240 is spaced apart from the optical lens 230 by about 10 mm, the luminance uniformity is increased so that the point shape formed by each of the light emitting diodes may not displayed. However, the linear shape formed by the linearly arranged light emitting diodes may be displayed on the diffusion plate 240.

Figure 13C:
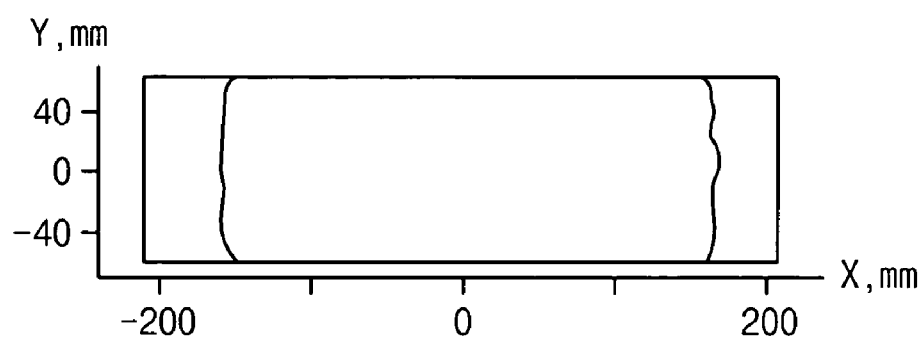

Referring to FIG. 13C, when the diffusion plate 240 is spaced apart from the optical lens 230 by about 22.5 mm, the luminance uniformity is greatly increased so that the point shape formed by each of the light emitting diodes may not displayed. In addition, the linear shape formed by the linearly arranged light emitting diodes may also not be displayed on a central portion of the diffusion plate 240. However, the linear shape may be displayed on a peripheral portion of the diffusion plate 240.

Figure 13D:
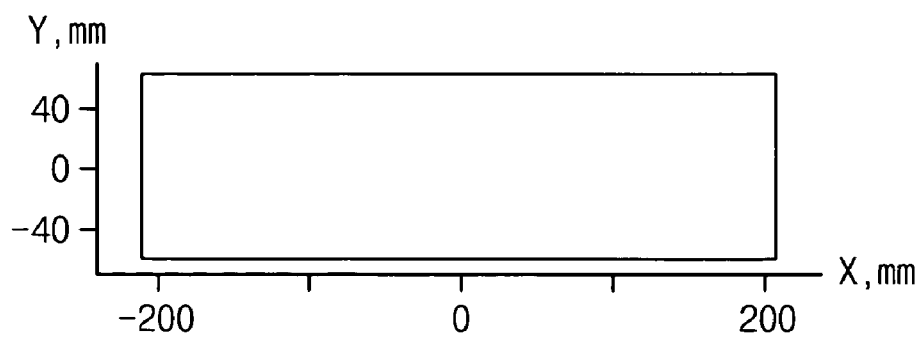

Referring to FIG. 13D, when the diffusion plate 240 is spaced apart from the optical lens 230 by about 32.5 mm, the luminance uniformity is maximized so that the point shape formed by each of the light emitting diodes and the linear shape formed by the linearly arranged light emitting diodes may not displayed on a substantially entire of the diffusion plate 240. In FIGS. 13A to 13D, each of the distances of about 5 mm, about 10 mm, about 22.5 mm and about 32.5 mm is between an upper surface of the optical lens 230 and a lower surface of the diffusion plate 240.

In FIGS. 12 to 13D, when the distance from the optical lens 230 to the diffusion plate 240 is no less than about 22.5 mm, the luminance uniformity of the light source unit is greatly improved. Therefore, although the light source unit includes red, green and blue light emitting diodes, red, green and blue lights are mixed to improve the color uniformity of the light source unit.

Figure 14:
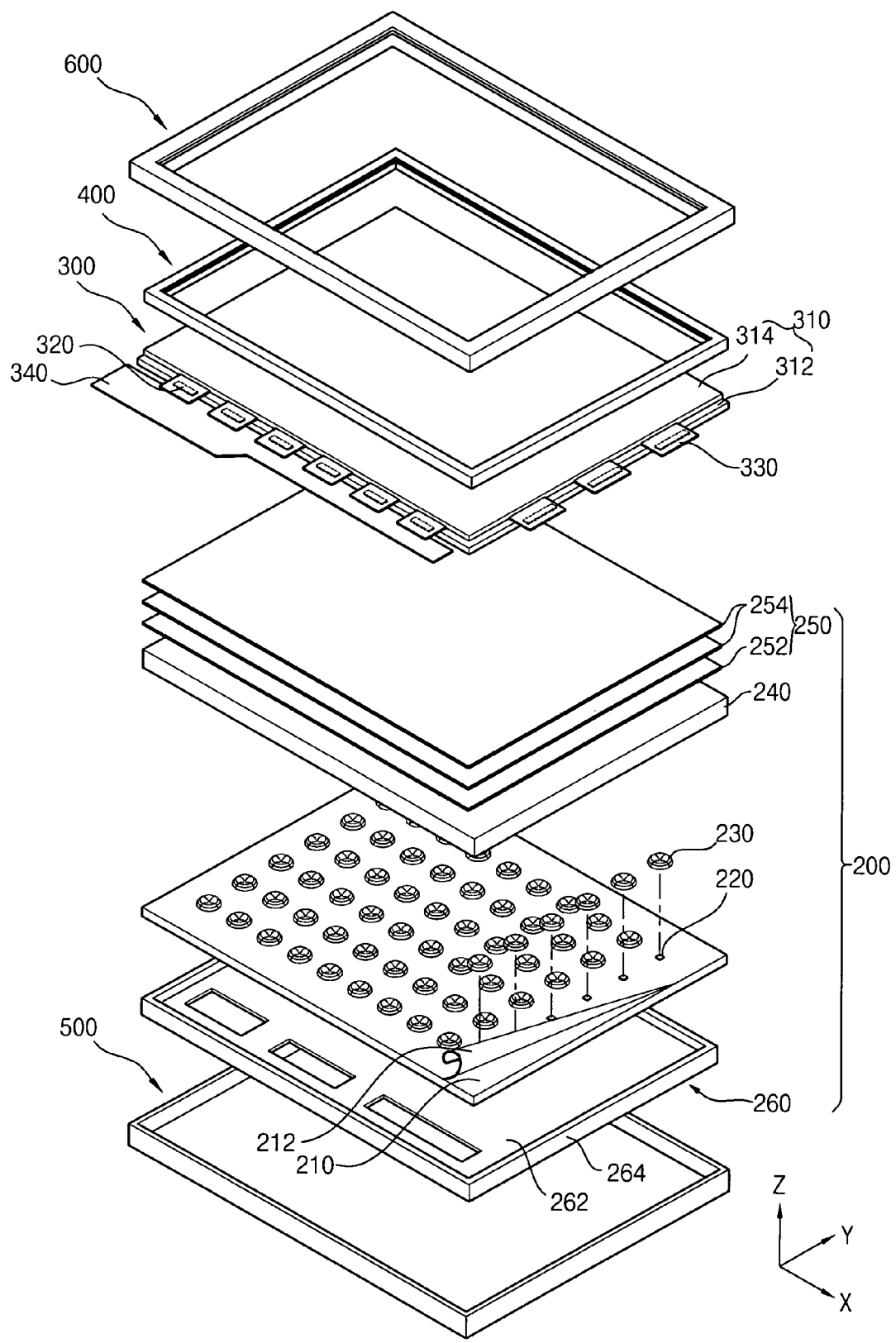
FIG. 14 is an exploded perspective view showing an exemplary embodiment of a liquid crystal display ("LCD") device in accordance with the present invention.

FIG. 14 is an exploded perspective view showing an exemplary embodiment of a liquid crystal display ("LCD") device in accordance with the present invention.

Referring to FIG. 14, the LCD device includes a backlight assembly 200, a display assembly 300, a top chassis 400, a rear case 500, and a front case 600.

The backlight assembly 200 includes a base substrate 210, a reflection sheet 212, a plurality of optical packages, a diffusion plate 240, optical sheets 250, and a receiving container 260.

The base substrate 210 includes a plurality of conductive lines to apply electric power to the optical packages.

The reflection sheet 212 is disposed between the base substrate 210 and the optical packages to prevent a light leakage toward a rear side of the LCD device.

Alternatively, a reflective layer may be coated on the base substrate 210 so that the reflection sheet 212 may be omitted.

Each of the optical packages includes a light emitting diode 220 and an optical lens 230. While the optical lens 230 is shown in the LCD device of FIG. 14, it should be understood that the optical lens 130 may alternatively be employed, or other alternatives of the optical lens within the scope of these embodiments. The optical packages are located on the base substrate 210 to generate a light having high luminance uniformity. Each of the optical packages may generate a white light.

Alternatively, the optical packages may generate red, green and blue lights, respectively.

The diffusion plate 240 is on the optical lens 230 to diffuse the light exiting the optical lens 230. The red, green and blue lights exiting the optical lenses 230 are mixed to form a white light.

The optical sheets 250 include a diffusion sheet 252 and a prism sheet 254. The diffusion sheet 252 diffuses the light that has passed through the diffusion plate 240. The prism sheet 254 increases a luminance of the light that has passed through the diffusion sheet 252 when viewed on a plane. While a particular arrangement of optical sheets 250 is shown, alternative sheets may be employed within the optical sheets 250, or, alternatively, the optical sheets 250 may not be employed for a less expensive device.

The receiving container 260 includes a bottom plate 262 and a sidewall 264. A portion of the bottom plate 262 is opened. The sidewall 264 is protruded from the bottom plate 262 in a direction substantially perpendicular to a surface of the bottom plate 262. The base substrate 210, the reflection sheet 212, the light emitting diodes 220, the optical lens 230, the diffusion plate 240 and the optical sheets 250 are received on the bottom plate 262 of the receiving container 260, in sequence.

The display assembly 300 includes an LCD panel part 310 for displaying an image, a data tape carrier package ("TCP") 320, a gate TCP 330, and an integrated printed circuit board ("PCB") 340. The display assembly 300 may include a plurality of data TCPs 320 and a plurality of gate TCPs 330.

The LCD panel part 310 includes an array substrate 312, a color filter substrate 314, and a liquid crystal layer (not shown). The array substrate 312 includes a plurality of data lines and gate lines arranged in intersecting directions to form a matrix of pixel regions including switching devices and pixel electrodes for displaying the image. The color filter substrate 314 corresponds to the array substrate 312 and may include a common electrode and a plurality of color filters corresponding to the pixel regions. The liquid crystal layer (not shown) is interposed between the array substrate 312 and the color filter substrate 314.

The data TCPs 320 are on a source side of the array substrate 312. The gate TCPs 330 are on a gate side of the array substrate 312. The source side and the gate side may be on a peripheral portion of the array substrate 312. The data and gate TCPs 320 and 330 apply driving signals and timing signals to the LCD panel part 310 to drive the LCD panel part 310 and to control a timing of the driving of the LCD panel part 310.

One end portion of each of the data TCPs 320 is attached to the source side of the array substrate 312. The other end portion of each of the data TCPs 320 is attached to the integrated PCB 340 so that the LCD panel part 310 is electrically connected to the integrated PCB 340. An end portion of each of the gate TCPs 330 is attached to the gate side of the array substrate 312 so that the gate TCPs 330 are electrically connected to the array substrate 312. The integrated PCB 340 applies electric signals to the data and gate TCPs 320 and 330 based on externally provided electric signals.

The data and gate TCPs 320 and 330 that are electrically connected to the LCD panel part 310 are bent backwardly along the sidewall 264 of the receiving container 260 so that the integrated PCB 240 is received on a rear surface of the bottom plate 262 of the receiving container 260.

The top chassis 400 is on the LCD panel part 310. The top chassis 400 covers a peripheral portion of the LCD panel part 310, and is combined with the receiving container 260 to fix the display assembly 300 to the receiving container 260.

The backlight assembly 200, the display assembly 300, and the top chassis 400 are received in the rear case 500. The rear case 500 is combined with the front case 600 that is on the top chassis 400.

According to the present invention, the surface of the optical lens that covers the point light source is divided into a plurality of surfaces. In particular, the surface of the optical lens may be divided into four surfaces. Each of the four surfaces is adjusted so that the luminance uniformity and the color uniformity are increased. In particular, the shapes of the four surfaces are optimized to maximize the luminance uniformity and the color uniformity.

In addition, the luminance uniformity and the color uniformity of the light that has passed through the four surfaces may be maximized at a predetermined region. When the light emitting diode having a substantially quadrangular shape is covered by the optical lens, the luminance uniformity and the color uniformity may be improved.

Furthermore, the luminance uniformity and the color uniformity are improved so that the light guiding plate may be omitted.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An optical lens comprising:
a recessed part having a substantially circular plan view and a substantially V shaped cross-section; and
a refracting part having a substantially circular periphery in plan view and extended from the recessed part;
wherein the refracting part comprises:
a first surface extended from a side of the recessed part;

a second surface extended from a side of the first surface; and a third surface extended from a side of the second surface, the third surface substantially in parallel with a vertical line that is substantially perpendicular to a bottom surface of the optical lens;

wherein light does not exit the optical lens through the recessed part, and light incident on the recessed part is totally reflected to the refracting part, the light refracted from each of the first, second, and third surfaces, and wherein the first, second and third surfaces form a convex shape.

2. The optical lens of claim 1, wherein the recessed part includes:

a first portion forming an angle of about 0° to about 5° with respect to a vertical direction and having a radius of about 3.080 mm to about 4.620 mm, the first portion being a nearest portion adjacent to a center of the optical lens, the vertical direction being substantially parallel with the vertical line that is substantially perpendicular to the bottom surface of the optical lens;

a second portion forming an angle of about 5° to about 10° with respect to the vertical line and having a radius of about 3.696 mm to about 5.544 mm, the second portion being connected to an outer periphery of the first portion;

a third portion forming an angle of about 10° to about 15° with respect to the vertical line and having a radius of about 4.024 mm to about 6.036 mm, the third portion being connected to an outer periphery of the second portion;

a fourth portion forming an angle of about 15° to about 20° with respect to the vertical line and having a radius of about 4.600 mm to about 6.900 mm, the fourth portion being connected to an outer periphery of the third portion;

a fifth portion forming an angle of about 20° to about 25° with respect to the vertical line and having a radius of about 4.768 mm to about 7.152 mm, the fifth portion being connected to an outer periphery of the fourth portion;

a sixth portion forming an angle of about 25° to about 30° with respect to the vertical line and having a radius of about 4.744 mm to about 7.116 mm, the sixth portion being connected to an outer periphery of the fifth portion;

a seventh portion forming an angle of about 30° to about 35° with respect to the vertical line and having a radius of about 5.344 mm to about 8.016 mm, the seventh portion being connected to an outer periphery of the sixth portion;

an eighth portion forming an angle of about 35° to about 40° with respect to the vertical line and having a radius of about 5.760 mm to about 8.640 mm, the eighth portion being connected to an outer periphery of the seventh portion; and a ninth portion forming an angle of about 40° to about 45° with respect to the vertical line and having a radius of about 5.384 mm to about 8.076 mm, the ninth portion being connected to an outer periphery of the eighth portion.

3. The optical lens of claim 1, wherein the first surface has a plurality of curved portions including a plurality of radii, respectively.

4. The optical lens of claim 1, wherein the second surface has a substantially flat shape.

5. The optical lens of claim 1, wherein an interface between the second and third surfaces has a substantially same height as a lowest point of the recessed part.

6. The optical lens of claim 1, wherein a height of the refracted part is about 1.6 mm to about 4.8 mm, and a radius of the refracting part is about 3.2 mm to about 4.8 mm.

7. The optical lens of claim 1, wherein the refracting part has an annulus shape in plan view.

8. The optical lens of claim 1, wherein the bottom surface has a centrally located indentation positioned below the recessed part.

* * * * *